UNITED STATES PATENT OFFICE.

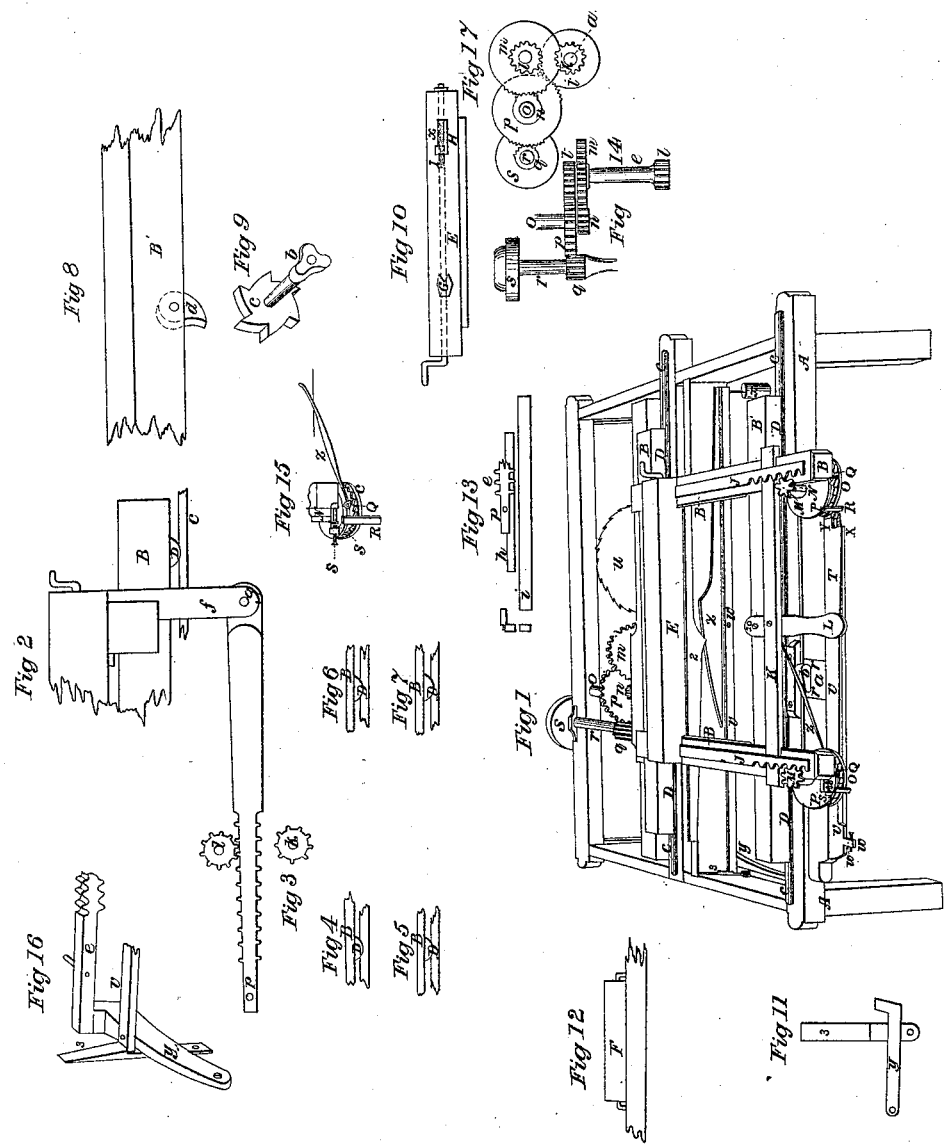
Z. Sargent,
Sawing Shingles.
N° 492. Patented Dec. 1, 1837.

ZEBULON SARGENT, OF CONTOOCOOKVILLE, NEW HAMPSHIRE.

MACHINE FOR SAWING SHINGLES.

Specification of Letters Patent No. 492, dated December 1, 1837.

*To all whom it may concern:*

Be it known that I, ZEBULON SARGENT, of Contoocookville, in the county of Merrimack, and State of New Hampshire, have invented a new and useful Improvement in Machines for Sawing Shingles, which is described as follows, reference being had to the annexed drawings of the same, making part of this specification.

The principal feature of my invention consists in a combination, arrangement, and adaptation of certain mechanical principles for advancing, and vibrating the shingle bolts or blocks of wood from which the shingles are cut, so that the shingles shall be sawed with the butt and tip alternately toward the saw; thus avoiding any waste of material and having the shingles of a uniform thickness and taper.

A, in the annexed drawings represents the frame of the machine, constructed of a suitable size and strength, to contain and support the several parts of the machine, hereafter described. See Figure 1. B, the carriage containing the head block and dogs for holding the shingle bolt and part of the apparatus for alternately changing the position of the shingle bolt, moving one way, on four grooved wheels, Fig. 1. C, C, the ways, Fig. 1. D, D, D, D, the four grooved wheels, Figs. 1, 4, 5, 6, 7. E, the head block, against which the shingle bolt is secured by means of two iron dogs—one of which is stationary, and the other movable, by means of a screw rod and crank handle as hereafter described. See Figs. 10 and 1. F, the shingle bolt, from which the shingles are sawed, Fig. 12. G, stationary dog, which is set in the face of the head block. See Fig. 10. H, the movable dog, containing a female screw in which a male screw-rod works, turned by a crank-handle, as before mentioned. See Fig. 10. I, the screw-rod turned by the crank handle, for bringing the movable dog in which there is formed a female screw against the end of the shingle bolt. See Fig. 10. J, J, are two racks, to the ends of which the head-block is fastened, Fig. 1. K, cross slide, secured to the racks. and moved to the right and left by means of a lever L attached to said slide and turning on a pin (10) inserted into one of the parallel pieces of the carriage, for throwing the racks in and out of gear with two pinions M, M, hereafter described, Fig. 1. L, the lever attached to the slide just mentioned for moving it to the right or left with the racks for throwing them in and out of gear with the pinions. See Fig. 1. M, M, two pinions fastened on the ends of vertical axles N, N, and working in the racks for advancing them alternately, for changing the position of the head block, and shingle bolt, in order to cut the shingle with the butt and tip alternately presented toward the saw, Fig. 1. N, N, axles of the pinions, to the upper ends of which the pinions are secured, Fig. 1. O, O, two ratchet wheels, having the teeth on the upper face, fastened on the lower ends of the axles N, N, and caused to turn horizontally with them in the manner hereafter described. See Fig. 1. P, P, two dog wheels, for moving the ratchet wheels, having no teeth but dogs on the under side thereof facing the teeth of the ratchet wheels, and turning loosely on the axles N, N, except when they are geared with the ratchet wheels by means of the dogs Q, Q, when they are thus made to turn together, Fig. 1. Q, Q, the two dogs before mentioned attached to the dog wheels P, P, and dropping into the notches of the ratchet wheels O, O, for causing them to turn together when the dog wheels turn to the right and slipping loosely over the notches when said dog wheels turn to the left, Figs. 15, and 1. R, R, are two arms fastened to the dog wheels, and which are made to come in contact alternately with stops V, W, X, Y, on the fly board T, (hereafter described) for advancing and vibrating the shingle-bolts by means of the dog-wheels, dogs, ratchet wheels, pinions, racks, and spring Z, hereafter described. See Figs. 1, and 15. S, a plate secured in the top of the dog-wheel which comes in contact with a screw stop (s) attached to the carriage for determining the thickness of the required shingle, Figs. 1 and 15. This screw is advanced when a thick shingle is required and receded when a thin one is desired. T, a vibrating fly-board, vibrating on a pin U, inserted in the top of a projecting side piece of the frame having two stops at each end against which the arms R, R, alternately strike when the carriage is run back for determining the tip and butt of the shingles— those marked V and Y, are fixed, and are for determining the butts—those marked W, X, are movable screw stops, and are for determining the tips and may be regulated at pleasure. U, pin on which the fly board vibrates inserted in the frame, Fig. 1. V, fixed stop on the fly board for determining the butt of the shingle, Fig. 1. W, movable screw stop on the same end of the fly board with stop V, for determining the tip of the shingle and regulated at pleasure, Fig. 1. X, Y, stops at the opposite end of the carriage for alternately moving the other end of the shingle bolt. When the arm R strikes stop V, the end of the bolt nearest said stop is advanced for a butt and at the same time the other arm strikes stop X, and advances the other end of the bolt for a tip. The next movement of the carriage reverses the operation. Z, spring for turning back the dog wheel to the position in which it was in before the arm came in contact with the stop—the dog wheel being turned partly around by the arm coming in contact with the stops V X or W Y. In turning it back the plate S, comes in contact with the screw stop (s) for determining the thickness of the shingle and holds it in that position until the carriage (returned by the action of pinion k,) Figs. 3, and 17 on rack e Fig. 2, causes the arms R, Fig. 1, to act on the several stops.

a, Fig. 1, represents a horizontal arm projecting from the center of the fly board at right angles to the same having a fork in the end of the same to receive a cam wheel made in a proper form to give the fly-board its intended vibratory motion. See b, Figs. 1, 2, 9. On the opposite end of the shaft of this cam wheel is a cog wheel c, Fig. 9, of six cogs which performs one revolution in sawing six shingles—the rotary motion being produced by a tooth or catch d, Fig. 8, on the under side at one of the sides of the carriage coming in contact with the said cog wheel as the carriage is run back, and which thus turns the said cam wheel b, one sixth of a revolution at every change. b, the cam wheel. See Figs. 1 and 9. c, cog wheel on the end of the shaft of the cam wheel, Fig. 9. d, tooth or cam on the under side of the carriage for turning the cog wheel c, Fig. 8. e, Fig. 2, double rack for bringing forward the carriage and for running it back. This rack is attached to an arm f, of the carriage by a pin g, on which it moves and is retained in gear with a pinion l, that propels it toward the circular saw by a way m Fig. 13 on which a pin p, slides—said pin p, being inserted into the side of the double racks, marked e—f, arm before mentioned to which the rack is attached, Fig. 2. p, pin in the side of the rack, Fig. 2. h, upper way over which the pin p, moves for keeping the rack in gear with the upper pinions, Fig. 13. i, lower way made longer than the upper way and placed immediately below it, upon which the pin of the rack falls when it arrives at the end of the upper way for putting the rack in gear with a pinion K, Fig. 3, below the one marked l, Fig. 2, just mentioned, for running back the carriage, the motion of which is much faster than the upper pinion. Fig. 13. k, Figs. 3 and 17, lower pinion for running back the carriage: this pinion is fixed on an axle a under and parallel with axle l, Figs. 14, 17, on which first mentioned axle is a cog-wheel t, into which works cog-wheel p, turned by pinion q, which is turned by band wheel s. l, axle of the upper pinion, Figs. 2, and 14. m, Figs. 1 and 14, cog wheel on the ends of axle l, of Fig. 2. n Figs. 1 and 14, pinion working into cog wheel m, which it turns with pinion l, Figs. 2 and 14, for advancing the carriage. o, axle of pinion p, Figs. 1 and 14. p, Figs. 1, 14 and 17, cog-wheel or axle o, working into cog-wheel t, which turns pinion k, for running back the carriage. q, pinion working into cog-wheel p. r, axle for pinion q, Figs. 1 and 14. s, pulley or axle r, Figs. 1 and 14. t cog wheel on the end of the axle of the second pinion for running back the carriage, into which works the cog wheel p, Figs. 14 and 17. u, Fig. 1, circular saw for cutting the shingles. v, Fig. 1, a lever turning on a pin w, inserted in one of the longitudinal beams of the frame, having at one of its ends an arm y, at right angles to the same for raising the rack from the lower to the upper way, having a weight x, suspended at the other or opposite end for depressing this end and raising the first mentioned end with the arm y, and the double rack to the upper way. This lever v, is again pressed down by a wedge shaped lever z, vibrating on a pin 1 inserted in the frame which last mentioned wedge shaped lever is borne down by a cam 2 on the under side of the carriage. The first-mentioned lever is held down by a spring catch 3, Figs. 1 and 11 and 16, until the carriage—when run back, strikes this spring catch, liberates the end of the lever v, therefore suffers the weight to perform its office of depressing the opposite end of the lever b, and raising the other end with the arm y and double rack c which it elevates, until the pin p in it is on a level with the upper way h, Fig. 13, on which it is made to slide. w, pin in which the lever v, vibrates, Fig. 1. x, the weight before mentioned. y, arm attached to the end of lever v, for raising the rack from the lower to the upper way, Fig. 1. z, second lever; the upper side of which being an inclined plane, Fig. 1. 1, pin on which the second lever vibrates, Fig. 1. 2, cam on the under side of the carriage for depressing one end of lever v, at one end, and elevating it at the other, Fig. 1. 3, the spring catch passing over the end of lever v, and holding it down until the carriage (when run back) comes in contact with it, pushes it off the end of the lever and suffers the weight at the other end to depress this end, and raise the end of the lever with the racks. See Fig. 1, also Fig. 11, in which $y$ represents the arm.

Operation: The shingle block or bolt from which the shingles are to be sawed having been prepared and properly secured on the carriage B in a position to saw a shingle with the butt toward the saw the machine is put in motion by steam, water, or any convenient power, the carriage advances with the bolt against the saw through which it passes and takes off a shingle during this operation, while the carriage advances the cam 2 under it presses down the end of lever $l$, this the end of levers $v$ and raises weight $w$, at one end and suffers the spring catch to spring over the ends of the lever $v$ to which the arm $y$ is attached and holds it in this position until the return of the carriage. At the moment the circular saw has passed through the bolt the pin $g$ in the double rack $e$, Fig. 2, falls from the short way $h$, Fig. 13, to the long way $i$ below it and thus causes the rack to gear into the lower pinion $k$, Fig. 3, which has a quick motion for running back the carriage, which it does in a few seconds by means of the pinion working into the teeth on the lower side of the rack. During the movements of the carriage in returning the tooth $d$, Fig. 8, on the under side thereof takes hold of a tooth of the cog wheel $c$, Fig. 9, on the axle of the cam wheel $b$ turns the latter one-sixth of a revolution so as to vibrate the fly board T far enough out at one end to bring the permanent stop V of the fly board in a line with the arm R of the cog-wheel P against which it comes in contact, causing the cog wheel and ratchet wheel geared to the same by the dog Q to move around far enough to bring the butt of the next shingle from the saw which is effected by the pinion M on the end of the axle N of the ratchet wheel O, working in the rack J in the end of the head-block. This moves the end of the head block E with the shingle bolt outward toward the saw the required distance. At the same time the screw stop X at the other end of the flyboard is brought in a line with the arm R of the second dog wheel P which moves the other end of the bolt the required distance for the point of the shingle. The end of the carriage comes in contact with the spring catch 3, pushes it from the end of the lever $v$; the weight $x$ falls, depresses the end of said lever $v$, to which it is suspended and raises the other end with one end of its arm $y$ and the rack $e$, Figs. 2 and 13, upon it and causes it to gear into the upper pinion $l$ for again advancing the carriage, the pin $p$ sliding along on the upper way. The carriage then advances as before and a shingle is sawed with the point toward the saw. The carriage is then run back as before, but the cam $b$ moves the fly-board T only so far as to bring the screw stop W in a line with the arm R of the dog-wheel at one end and the permanent stop Y at the other end, which moves the bolt out far enough to present the butt of the shingle toward the saw and so on alternately presenting a tip and a butt until the bolt is sawed into shingles. The slide S and screw stop $s$ are for gaging the thickness of the shingles. Instead of running back the carriage by means of the double rack working between the two pinions it may be run back by applying a shingle rack to the under side of the lower pinion.

The invention claimed by me, the said ZEBULON SARGENT, and which I desire to secure by Letters Patent consists—

1. In the mode of gaging the thickness of the shingle and vibrating the bolt so as to present alternately a tip and butt to the saw in the manner before described.

2. The combination of the various parts above described for advancing and running back the carriage, whether the same be constructed as above described or in any other presenting substantially the same combination.

Z. SARGENT.

Witnesses:
 THOMAS BURNHAM,
 JOHN H. ALLEN.